United States Patent [19]
Sakabe et al.

[11] Patent Number: 5,722,076
[45] Date of Patent: Feb. 24, 1998

[54] INTRA-PREMISES COMMUNICATION SYSTEM

[75] Inventors: Masashi Sakabe, Tsu; Isao Shimada, Takarazuka; Teruhito Nakamura, Osaka; Yoshiyuki Komoda, Kobe; Kiyotaka Takehara, Ashiya; Takashi Saeki, Hirakata, all of Japan

[73] Assignee: Matsushita Electric Works, Ltd., Kadoma, Japan

[21] Appl. No.: 443,439

[22] Filed: May 18, 1995

[30] Foreign Application Priority Data

May 20, 1994 [JP] Japan .................... 6-107180

[51] Int. Cl.$^6$ .................. H04Q 7/20; H04Q 7/32
[52] U.S. Cl. .................. 455/450; 455/426; 455/454; 455/507
[58] Field of Search .................. 379/58–60, 61–62, 379/56–57; 340/825.79; 439/676; 174/153 A; 370/60; 455/54.1, 33.1, 33.2, 450, 451, 452, 453, 454, 426, 67.1, 507, 517

[56] References Cited

U.S. PATENT DOCUMENTS

| | | | |
|---|---|---|---|
| 4,090,030 | 5/1978 | Lagasse | 174/153 |
| 4,456,793 | 6/1984 | Baker et al. | 379/56 |
| 4,975,926 | 12/1990 | Knapp | 375/1 |
| 5,310,363 | 5/1994 | Brownell et al. | 439/676 |
| 5,355,520 | 10/1994 | Freeburg et al. | 455/507 |
| 5,475,681 | 12/1995 | White et al. | 370/60 |
| 5,485,634 | 1/1996 | Weiser et al. | 455/54.1 |
| 5,519,763 | 5/1996 | Namekawa et al. | 379/61 |
| 5,541,586 | 7/1996 | Wise | 340/825.79 |
| 5,564,070 | 10/1996 | Want et al. | 455/507 |

Primary Examiner—Curtis Kuntz
Assistant Examiner—Binh K. Tieu
Attorney, Agent, or Firm—Armstrong, Westerman, Hattori, McLeland & Naughton

[57] ABSTRACT

An intra-premises communication system enables the use of a preinstalled wired transmission channels, yet allowing a particular communication system to be located at a desired region in the premises. The system comprises an exchange box adapted to be installed in the premises and provided with different interfaces for connection to different networks. A plurality of the wired transmission channels extend from the exchange box and terminate to receptacles which are installed in the premises and have common connectors. A plurality of indoor wireless terminals of different types are provided for use within the premises. A plurality of local transmitter-receivers of different types are provided in correspondence to the types of the wireless terminals. Each of the local transmitter-receivers is detachably and selectively mounted to the common connector of the receptacle for wired communication with one of the networks through the associated transmission channel. The local transmitter-receivers have individual antennas or the like member for wireless communication with at least one of the terminals. The exchange box includes a switch for connecting the transmission channels selectively to particular ones of the interfaces, thereby allocating local transmitter-receivers and the associated terminals to the different networks. The receptacles can be preinstalled in the like fashion as the conventional electrical receptacles so that a desired wireless communication system can be located at a suitable region simply by mounting the local transmitter-receiver of the selected type to the common connector of the receptacle.

8 Claims, 14 Drawing Sheets

| receptacle no. | location | unit type | status |
|---|---|---|---|
| 1 | A-1 | PHP | in operation |
| 2 | A-2 | PHP | in operation |
| 3 | A-3 | PHP | failure |
| 4 | B-1 | LAN-RPT | in operation |
| 5 | B-2 | LAN-RPT | in operation |
| 6 | C-1 | none | none |

INTRA-PREMISES COMMUNICATION SYSTEM

BACKGROUND OF THE INVENTION

1. Field of the Invention

The present invention is directed to an intra-premises communication system which combines wired and wireless communications for use in a premises.

2. Description of the Prior Art

Recently, an information transmission system relying in part a wireless communication has been proposed for use in an office or factory. The system may be a local area network (LAN) for intercommunication among data terminals, a telephone network system called a personal handy phone system (PHS) which will be soon available in Japan to enable the use of a wireless handy phone for local telecommunication within the premises as well as for telecommunication with outside network, and/or a load management system for monitoring and controlling a load such as a lighting equipment by the use of a remote controller. The system includes local transmitter-receivers which are adapted to be mounted on a wall, ceiling or floor of the premises for wireless communication among indoor terminals through the local transmitter-receivers. For constructing the LAN network with wireless data terminals, a hub is provided for connection through a wired transmission channel to the local transmitter-receiver for enabling data transmission among the terminals through the hub. For constructing the telephone network with handy phone terminals, a private branch exchange (PBX) is provided for connection through the wired transmission channel to the local transmitter-receiver to enable the telecommunication with the outside network in addition to the telecommunication between the handy phone terminals. Further, for constructing the load management system with remote controllers and a load, a gateway is provided for connection through the like wired transmission channel to the local transmitter-receiver in order to transmit the signal between the remote controller to a designated load for monitoring the load condition and/or controlling the load. In view of the above, the intra-premises communication system is desired to combine wireless and wired communication for constructing any one of the above networks.

When installing the above network in the premises, it is desirable to preinstall the wired transmission channels. However, since a decision is usually made after the construction which system is utilized in a particular region of the premises and where the local transmitter-receivers corresponding to the selected system are located, the preinstallation is practically difficult and obsolete. Consequently, the wired transmission channels have to be installed after construction in order to satisfy the need of implementing the selected network.

SUMMARY OF THE INVENTION

The above problem has been eliminated in the present invention which provides an intra-premises communication system enabling the use of a preinstalled wired transmission channels, yet allowing a particular communication system to be located at a desired region in the premises. The intra-premises communication system in accordance with the present invention comprises an exchange box which is adapted to be installed in the premises and is provided with different interfaces for connection to different networks. A plurality of wired transmission channels are installed in the premises to extend from the exchange box and terminate to receptacles which are also installed in the premises and have common connectors of identical configuration. A plurality of indoor wireless terminals of different types are provided for use within the premises. A plurality of local transmitter-receivers of different types are provided in correspondence to the types of the wireless terminals. Each of the local transmitter-receivers is detachably and selectively mounted to the common connector of the receptacle for wired communication with one of the networks through the associated transmission channel. The local transmitter-receivers have individual antennas or the like member for wireless communication with at least one of the terminals and have a conversion circuit for transfer between the information carried by way of the wired communication through the transmission channel and the information carried by way of the wireless communication. The exchange box is provided with a switch for connecting the transmission channels selectively to particular ones of the interfaces, thereby allocating local transmitter-receivers and the, associated terminals to the different networks. With this configuration, the receptacles can be preinstalled in the like fashion as the conventional electrical receptacles so that a desired wireless communication system can be located at a suitable region simply by mounting the local transmitter-receiver of the selected type to the common connector of the receptacle. Further with the provision of the exchange box, thus constituted wireless communication system can be selectively connected to one of the different networks through the associated transmission channel and the interface, whereby the wireless communication system can be linked to the corresponding network.

In a preferred embodiment, the wireless terminals include data terminals and handy phone terminals. One type of the local transmitter-receiver includes a circuit which is cooperative with a hub, one of the interfaces, to construct a local area network (LAN) which enables data transmission among the data terminals. Another type of the local transmitter-receiver includes a circuit for intercommunication with the phone terminals. The circuit is connected through the transmission channel to a private branch exchange (PBX) for connecting the handy phone terminals to the outside network.

Preferably, the interfaces are arranged to enable intercommunication between the networks, for example, between the LAN and the telephone system for making data and facsimile transmission to and from the data terminals through the telephone line. When one of the network is made as a load management system for monitoring and/or controlling a load such as a lighting equipment, the load management system can be linked though the interfaces to the LAN and the telephone system so that the data terminals and the handy phones can access the load easily and conveniently for efficient load management.

The receptacle comprises a base plate with the connector. The base plate carries a pair of mounting brackets which are pivotally supported at one end to the base plate and are provided with screws. The screw extends through a periphery of the base plate and through an intermediate portion of the bracket. The base plate is placed on a mounting surface of a wall, ceiling or floor in order to project the brackets behind the mounting surface through a mounting hole formed in the surface. The screw is held in threaded engagement with the bracket in such a manner that tightening of the screw causes the brackets to expand behind the mounting surface for gripping the periphery of the mounting hole between the brackets and the circumference of the base plate. Thus, the receptacle can be readily installed on the wall, ceiling or the floor of the premises simply by drilling the mounting hole, placing the base plate around the mounting hole, and tightening the screws.

The receptacle has a pair of electrical contacts which are to be connected to a voltage source through a suitable cables routed in the wall, ceiling or floor of the premises. The receptacle is formed with a pair of slots which engages with prongs projecting from the local transmitter-receiver. The electrical contacts are positioned adjacent the slots to be in electrical connection with the prongs for supplying an electric power to the local transmitter-receiver. The connector of the receptacle is provided in the form of a modular jack connected to the transmission channel. The local transmitter-receiver having a plug detachable to the modular jack. Thus, the modular jack is utilized as the common connector for connection of the local transmitter-receiver to the transmission channel.

These and still other object and advantageous features of the present invention will become more apparent from the following detailed description of the embodiment when taken in conjunction with the attached drawings.

DETAILED DESCRIPTION OF THE EMBODIMENT

Figure 1:
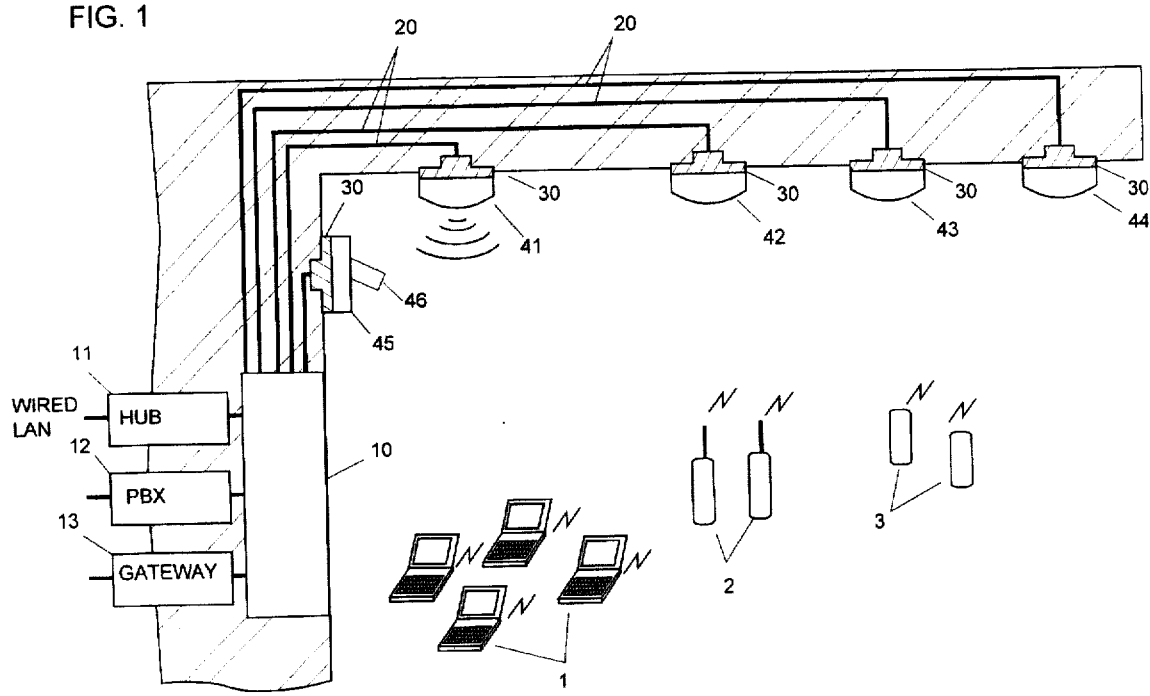
FIG. 1 is a schematic view illustrating an intra-premises communication system in accordance with a preferred embodiment of the present invention.

Referring now to FIG. 1, there is shown an intra-premises communication system in accordance with a preferred embodiment of the present invention. The system comprises an exchange box 10 and a plurality of receptacles 30 connected to the exchange box 10 by way of individual wired transmission channels 20. Also connected to the exchange box 10 are different interfaces composed of a hub 11 for an LAN (local area network), a PBX (private branch exchange) 12, and a gateway 13 for a building automation network or a load management network carrying one or more load such as a lighting equipment. The exchange box 10, the transmission channels 20 and the receptacles 30 are preinstalled in the wall, ceiling, or floor of the premises. The receptacles 30 are provided with individual connectors of the identical configuration to which a variety of local transmitter-receivers are selectively and detachably mounted for wiring connection to the transmission channel 20. The local transmitter-receivers include a LAN unit 41 for wireless communication with data terminals 1, a phone unit 42 for wireless communication with personal handy phone terminals 2, a remote controller unit 43 for wireless communication with remote control terminals 3, a detector unit 44 and a camera unit 45 with a television camera 46.

The transmission channel 20 may be a twist pair wire, coaxial cable, or optical fiber. When the optical fiber is utilized, the receptacle 30 is provided with a converter for conversion electrical signal into optical signal and vice versa.

The exchange box 10 comprises a patch panel (not shown) as a switch mechanism for connecting the interfaces 11 to 13 to selected ones of the transmission channels 20, i.e., the receptacles 30 by switching patch cords.

Figure 2:
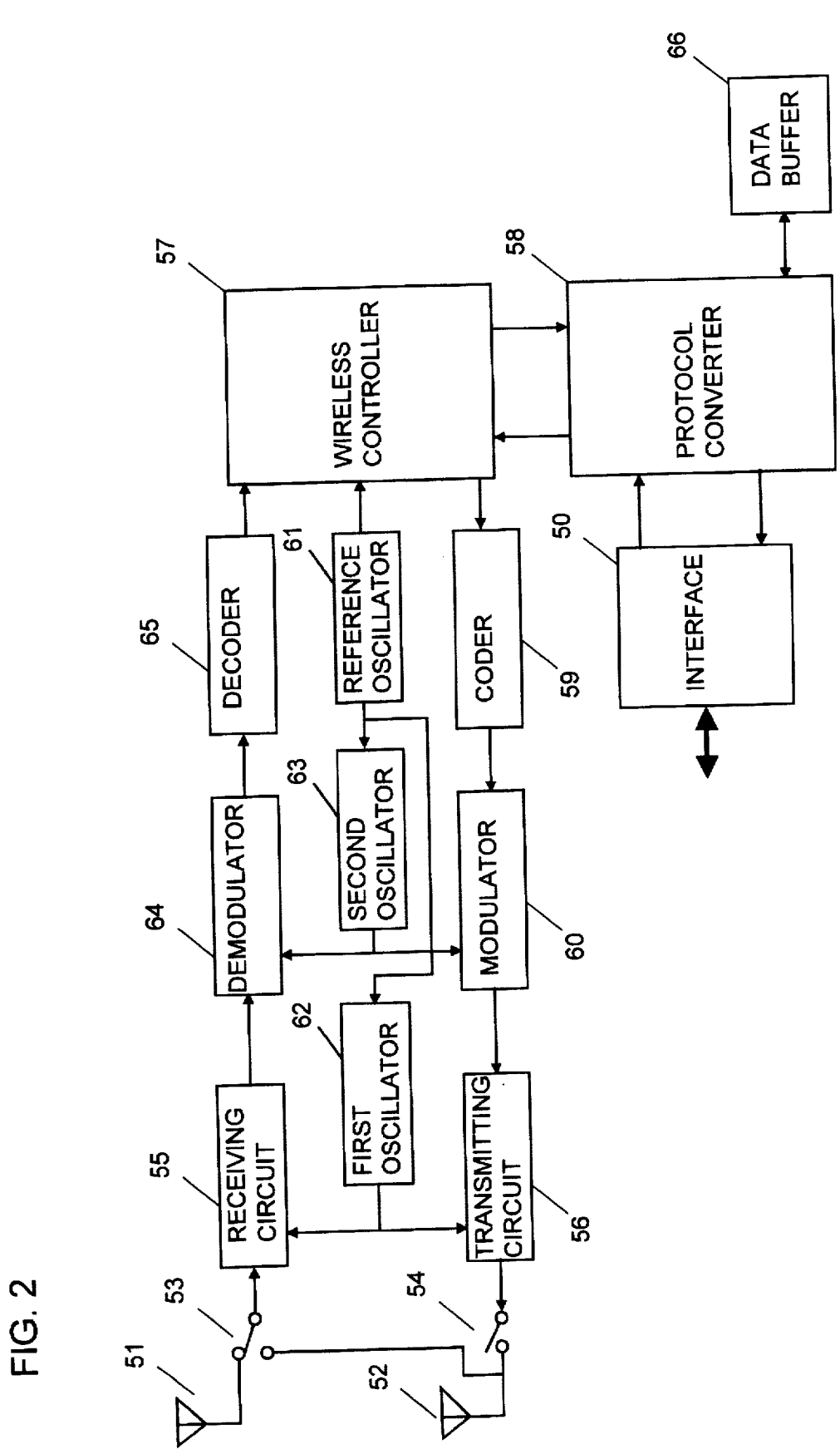
FIG. 2 is a block diagram of a communication unit provided in a data terminal of the above system.

For constructing the LAN network, a personal computer having a modem unit is utilized as the data terminal 1. As shown in FIG. 2, the modem unit comprises an interface 50 which conform to PCMCIA regulation for connection with the computer. The modem unit is provided with a pair of antennas 51 and 52 for wireless communication with the LAN unit 41. The antenna 51 is connected through a two-way switch 53 to a receiving circuit 55, while the antenna 52 is connected through the two-way switch to the receiver 55 as well as through a switch 54 to a transmitting circuit 56. Thus, the receiving circuit 55 can use either of the antennas 51 and 52 to effect diversity signal reception. A wireless controller 57 is provided to effect the switching between the signal transmission and reception as well as the switching between the antennas 51 and 52 in diversity signal reception. Further, the wireless controller 57 is responsible for controlling the other associated function of the modem unit such as for determining the timing of data transmission and reception. The computer delivers signals prescribed by a wired LAN protocol to the interface 50. A protocol converter 58 is connected to the interface 50 for making protocol conversion between the wired LAN and the wireless LAN. Data to be transmitted from the data terminal 1 is fed through the wireless controller 57 to a coder 59 where it is encoded for data compression or the like. Thus encoded digital signal is then modulated at a modulator 60 and is further converted into a high frequency signal at the transmitting circuit 56. A reference oscillator 61 is provided to generate a clock signal utilized in the wireless controller 57. Based upon the clock signal a high frequency signal is generated for signal mixing at the transmitting circuit 56. For this purpose, a first oscillator 62 generates a high frequency signal in synchronism with the clock signal from the reference oscillator 61, which high frequency signal is then mixed at the transmitting circuit 56 with an output of the modulator 60 for effecting frequency conversion of the output of the modulator 60. A second oscillator 63 is provided to generate a high frequency signal in synchronism with the clock signal of the reference oscillator 60 in order to use the high frequency signal as a carrier. Modulation at the modulator 60 may be made in accordance with FSK, PSK, QAM or the like method. At the receiving circuit 55 the reception signal is mixed with the high frequency signal from the first oscillator 62 to be converted into a low frequency signal which is subsequently demodulated at a demodulator 64 into a digital signal by the use of the high frequency signal from the second oscillator 63. The digital signal is further decoded at a decoder 65 followed by being fed through the wireless controller 57 to the protocol converter 58 where it is converted to a data conformed with the wired LAN protocol. A data buffer 66 is coupled to the protocol converter 58 for temporarily storing data during the protocol conversion in order to avoid data loss which might otherwise occur due to the difference in data transfer speed between the wired LAN and the wireless LAN. The modem unit can be provided as a card to be inserted into the slot of an IC card drive of the computer or as a board to be mounted in an expansion bus slot of the computer.

Figure 3:
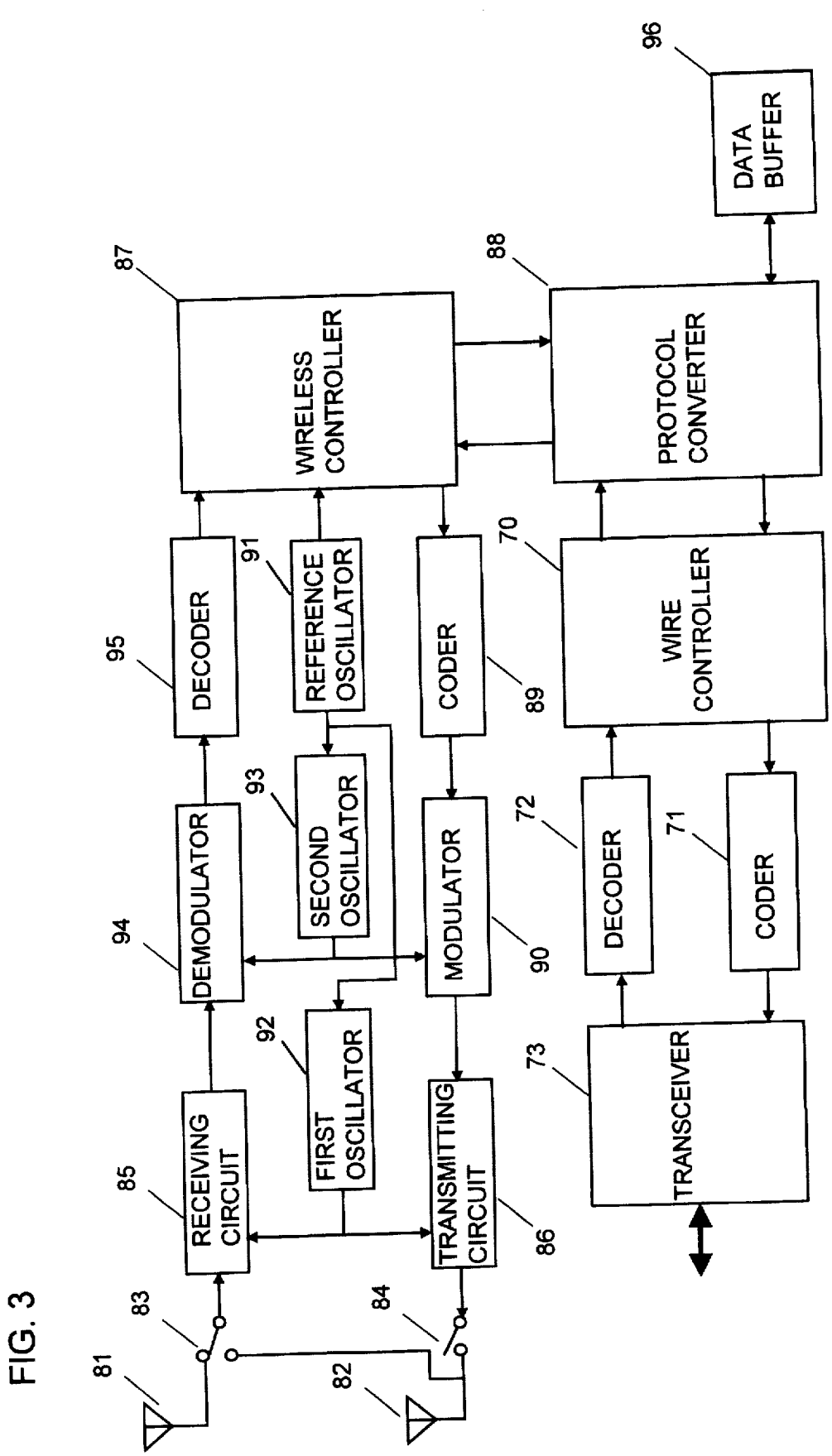
FIG. 3 is a block diagram of a local transmitter-receiver in the form of a LAN unit utilized in the above system.

As shown in FIG. 3, the LAN unit 41 has the like circuit configuration as the modem unit except that a wire controller 70, a coder 71, a decoder 72, and a transceiver 73 are provided instead of the interface utilized in the modem unit of FIG. 2 for connection with the wired LAN through the transmission channel 20. The transceiver 73 acts as an interface with the wired LAN and is controlled by the wire controller 70 to switch the data delivery to and from the wired LAN at a suitable timing. The coder 71 and decoder 72 are provided between the transceiver 73 and the protocol converter 88 for data delivery to and from the wired LAN. The LAN unit includes the elements which are identical in function to those utilized in the modem. The elements are antennas 81 and 82, switches 83 and 84, receiving circuit 85, transmitting circuit 86, wireless controller 87, coder 89, modulator 90, reference oscillator 91, first oscillator 92, second oscillator 93, demodulator 94, and decoder 95.

Figure 4A:
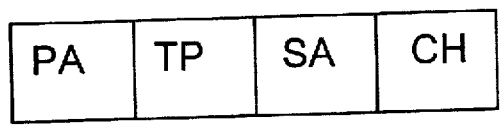
FIGS. 4A to 4D are diagrams illustrating formats of signals transferred between the communication unit and the LAN unit.
Figure 4B:
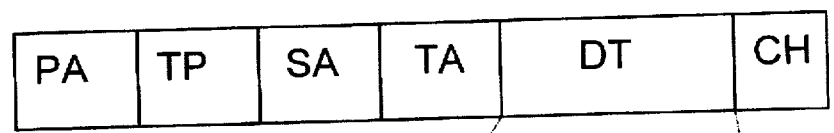
Figure 4C:
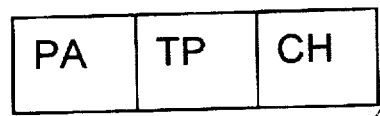
Figure 4D:
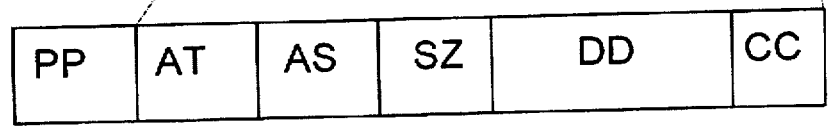

The wireless controller 57 and 87 operate differently according to a condition whether all of the data terminals 1 are within an accessible region to the associated LAN unit 41 for wireless communication therebetween or anyone of the data terminals 1 is connected to the wired LAN. As shown in FIGS. 4A to 4C, there are three types of formats for the signal transmitted between the LAN unit and the modem unit of the data terminal 1, i.e., for the input signal to the modulators 60 and 90, and output signal from the demodulators 64 and 94. The format of FIG. 4A is for the signal polling the data terminals 1 by the LAN unit 41 is composed of a preamble PA making synchronization to a destination, a type TP identifying the polling, an address SA designating the destination address, and a check code CH. The polling is made regularly to the data terminals 1 located within the accessible region by successively changing the addresses. The data terminal 1 issues the signal in the format of FIG. 4B when the address carried on the radio signal from the LAN unit 41 coincide with the own address. The signal is composed of a preamble PA, a type TP identifying the data transmission and specifying data size, transmission data DT, and a check code CH. The transmission data DT is a data in accordance with the protocol of the wired LAN and, as shown in FIG. 4D, is composed of a source address AT, a destination address AS, a data size SZ, a transmission data DD, and a check code CC for the wired LAN which utilizes the signal of the format having a preamble PP prefixed to the transmission data DT. Upon receiving the radio signal of the format of FIG. 4B, the LAN unit 41 issues to the data terminal 1 a confirmation radio signal having the format of FIG. 4C composed of a preamble PA, a type TP identifying the confirmation, and a check code CH, whereby the data terminal 1 confirms that the communication is normal.

Figure 5:
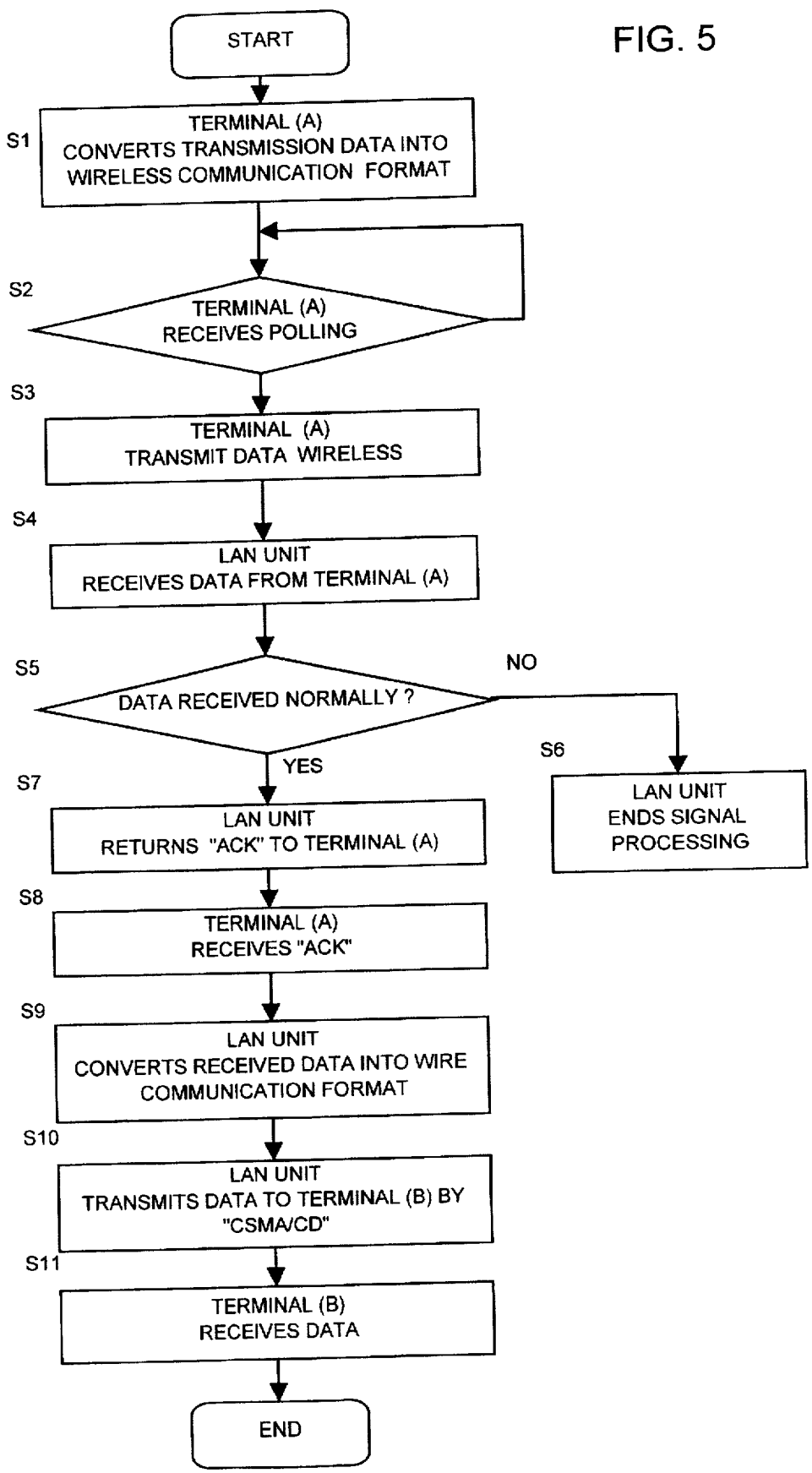
FIG. 5 is a flow chart illustrating data transfer between the data terminals.

When the data terminals (A) constructing the wireless LAN is to transfer data through the hub 11 to other data terminals B constructing a wired LAN, a procedure is made in accordance with the flowchart of FIG. 5. Firstly, data terminal (A) converts transmission data at protocol converter 58 into corresponding data of the format of FIG. 4B including the destination address [S1]. When this terminal (A) receives the signal in the format of FIG. 4B from LAN unit 41B and the destination address in the signal is coincident with the own address [S2], the terminal (A) transmits the data prepared in step [S1] as a wireless signal [S3]. Upon receiving the wireless signal from the terminal (A) [S4], the LAN unit 41 responds to check whether the transmission is normal or not. When not normal [S5], the LAN unit 41 waits to receive the data from the terminal (A) for a predetermined interval without making the polling and stops signal processing [S6] if normal data transmission is made in that interval. When the data transmission is normal, the LAN unit 41 returns "ACK" signal in the format of FIG. 4C to the terminal (A) [S7]. Upon receiving "ACK" signal [S8], the terminal (A) proceeds to the next step, otherwise continue to re-transmit the data only for a prescribed number of times until receiving "ACK" signal from the LAN unit. In response to the normal data transmission acknowledge, the LAN unit 41 derives data DT at the protocol converter 88 and appends the preamble PP to data DT to give a corresponding data signal for wired communication [S9]. Then, the LAN unit 41 transmits data DD by "CSMA/CD" method to the data terminal (B) having an address coincident with the destination address AS [S10]. Thus, the terminal (B) constructing the wired LAN can receive data DD from the terminal (A) of the wireless LAN [S11]. The terminal (B) may be a server. The hub 11 may be utilized for intercommunication among a plurality of networks.

Figure 6:
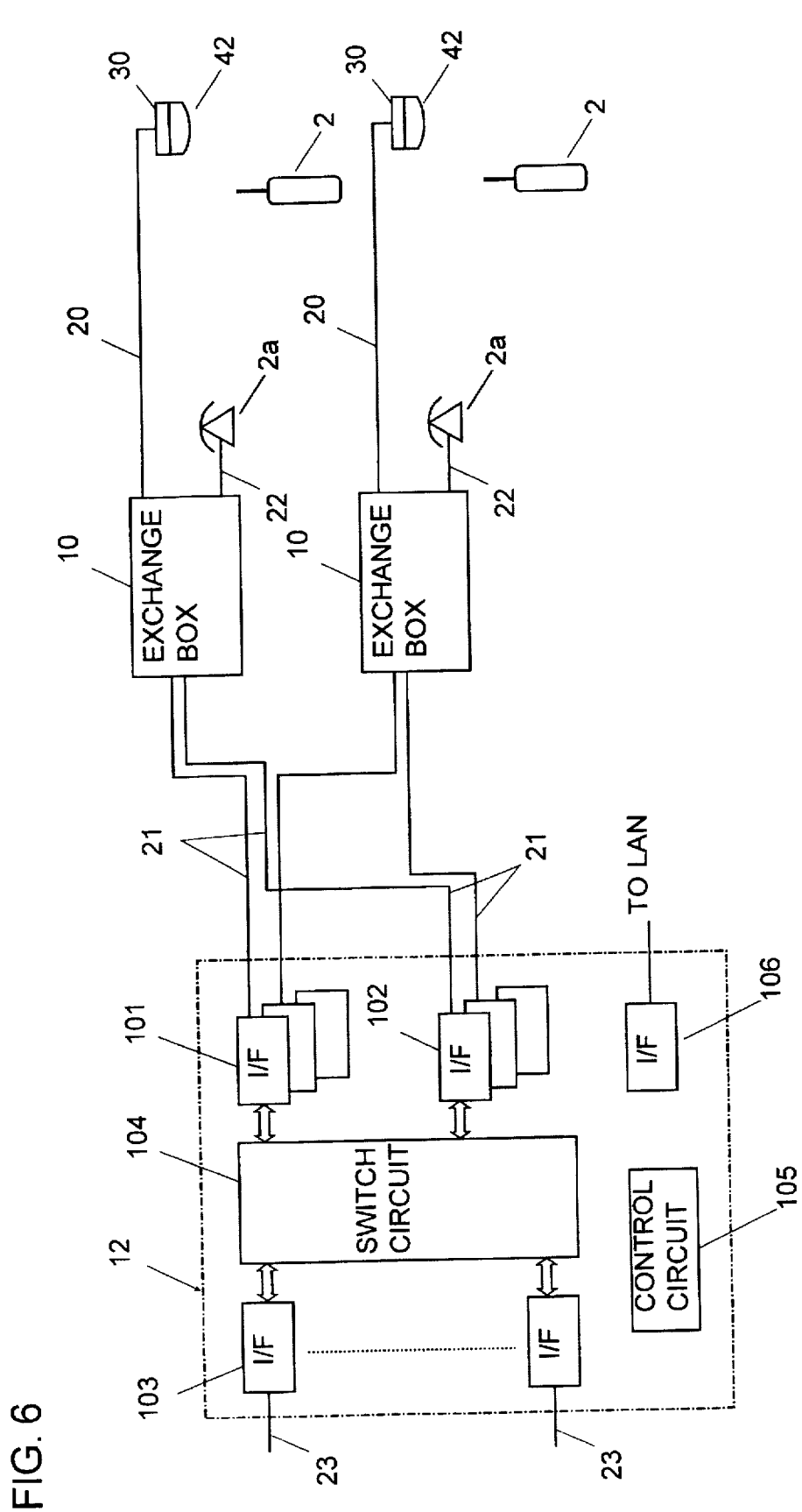
FIG. 6 is a block diagram of a telephone network realized by the present system.

Now, explanation is made to a telephone system utilizing the personal phone terminals 2. As shown in FIG. 6, the telephone system comprises the PBX 12 having extension lines 21 leading the exchange boxes 10 from which the transmission channels 20 extend to the receptacles 30, respectively for connection to the phone units 42, which in turn establish wireless communication with the phone terminals 2. A conventional telephone 2a may be connected through a wire 22 to the exchange box for wire connection with the PBX 12. The phone unit 42 is connected through the exchange box 10 to an interface 101 in the PBX 12, while the telephone 2a is connected through the exchange box 10 to an interface 102 in the PBX 12. The interface 101 is designed for wireless telecommunication made between the phone terminals 2 and PBX, while the interface 102 is for wired telecommunication between the conventional telephone 2a and PBX. The PBX 12 includes another interface 103 for connection with the central office line 23. A switch circuit 104 is provided in PBX to connect and disconnect the interfaces 101 and 102 to and from the interface 103 under the control of a control circuit 105 for enabling public telecommunication and private telecommunication between the phone terminals 2 and the telephones 2a. Also included in the PBX 12 is another interface 106 for connection with other networks, for example, the LAN and the load management network in order to transfer through the central office line 23 the data handled by the data terminals 1 and to control the load from the phone terminals 2 and the telephone 2a.

Figure 7:
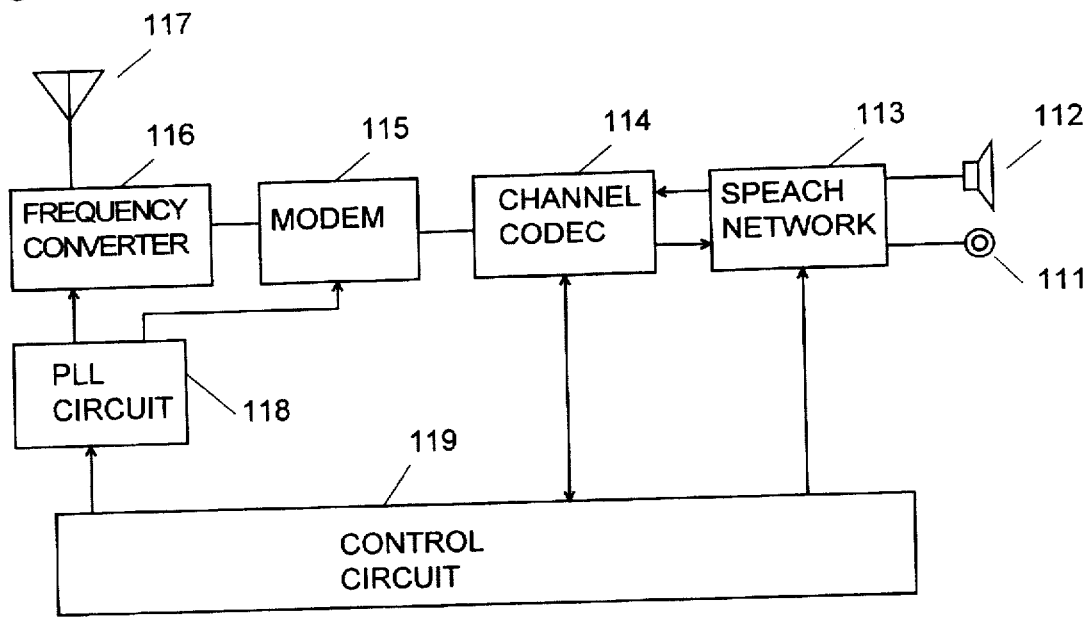
FIG. 7 is a block diagram of a persona handy phone utilized in the above telephone network.

As shown in FIG. 7, the phone terminal 2 comprises a microphone 111 and a speaker 112 connected to a channel codec (coder-decoder) 114 through a speech network 113 including an antiside tone circuit. Audio data encoded in the channel codec 114 is modulated at a modem 115 and is subsequently converted at a frequency converter 116 into a high frequency signal to be transmitted through an antenna 117. A high frequency signal received at the antenna 117 is frequency converted at the converter 116 and is subsequently demodulated at the modem 115 so as to be decoded at the channel codec 114 and fed to the speaker 112. The modem 115 and the frequency converter 116 are controlled by a PLL circuit 118 to operate synchronously. A control circuit 119 made of a microprocessor is provided to control the operation of the above elements.

Figure 8:
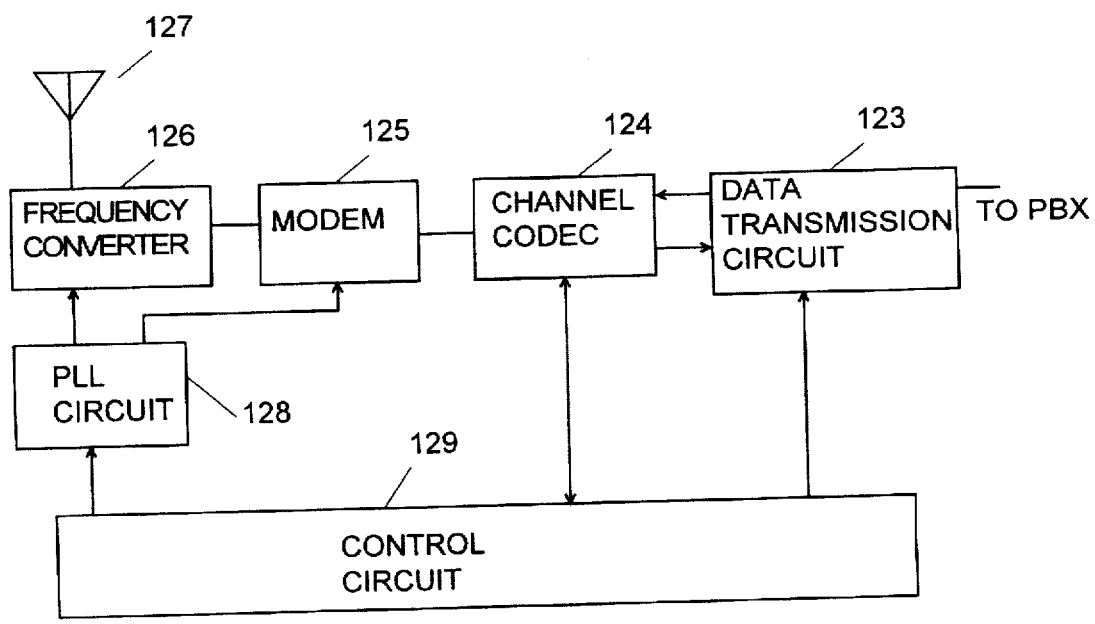
FIG. 8 is a block diagram of another local transmitter-receiver in the form of a personal handy phone relay unit.

As shown in FIG. 8, the phone unit 42 has the like configuration as the phone terminal 2 except that a data transmission circuit 123 provided instead of the speech network 113 for transmitting and receiving audio signal to and from the PBX 12 through a channel coded 124. Therefore, the phone unit 42 is composed of the channel codec 124, modem 125, frequency converter 126, antenna 127, PLL circuit 128, and control circuit 129 all of the same function as those in the phone terminal 2.

Figure 9A:
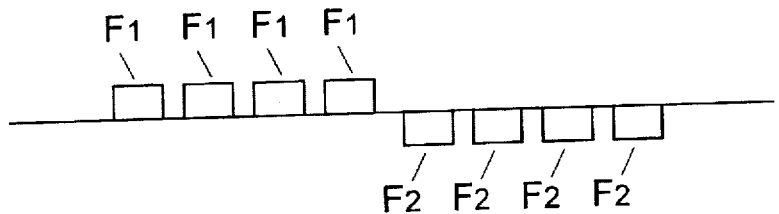
FIGS. 9A to 9C are diagrams illustrating formats of signals transferred between the handy phone and the relay unit.
Figure 9B:
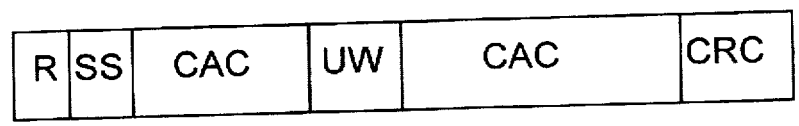
Figure 9C:
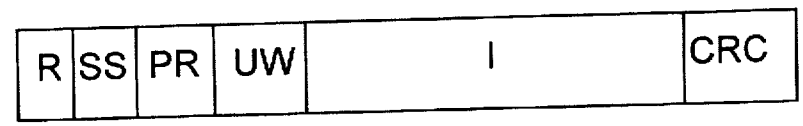

The phone unit 42 gives wireless signal for communication with the phone terminal 2 which signal has a protocol in conformity with RCR ST D-28 and is capable of simultaneous communication with up to four phone terminals. That is, the phone unit 42 transmits data composed of four frames F1, as shown in FIG. 9A, sequentially to the four phone terminals 2 by TDMA technique, and thereafter receive data composed of four frames F2 sequentially from the four phone terminals 2. The frames F1 and F2 are provided to give either of a control slot or communication slot of a fixed length. The control slot comprises, as shown in FIG. 9B, a ramp time R(4) for transient response, start symbol SS(2), control signal CAC (62), synchronization word UW(32), control signal CAC(108), error detection code CRC(16). Numerals in parenthesis represent bit numbers. The communication slot comprises, as shown FIG. 9C, a ramp time R(4), start symbol SS(2), permeable PR(6), synchronization word UW(16), information I(180) such as digitized voice, and error detection code CRC(16).

Figure 10A:
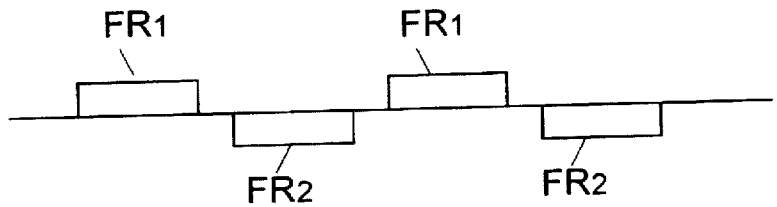
FIGS. 10A to 10C are diagrams illustrating formats of signals transferred between the handy phone relay unit and a private branch exchange (PBX)
Figure 10B:
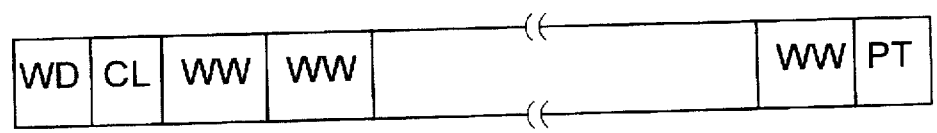
Figure 10C:
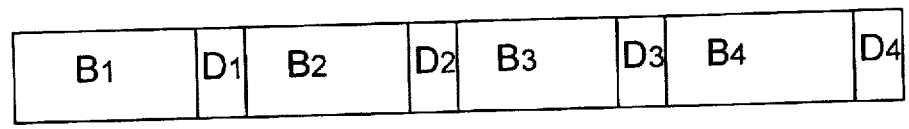

The wired communication between the phone unit 42 and the PBX 12 is made by transferring signal of digital data, as shown in FIG. 10A to 10C. The digital PBX 12 transmits to the phone unit 42 data within a frame FR1 which alternates with a frame FR2 within which the PBX receives data from the phone unit, as shown in FIG. 10A. These frames FR1 and FR2 has a format capable of transferring plurals words each composed of 36 bits. The format is, as shown in FIG. 10B, composed of word number WD(8), data CL(8) indicating start and stop of digital transfer, data WW, and parity PT(1). The data WW is a 36-bits signal which is, as shown in FIG. 10C, composed of four sets of 8-bits data B1 to B4 of actual information to be transferred plus 1-bit control data D1 to D4, each set provided for each of the four phone terminals 2.

Figure 11:
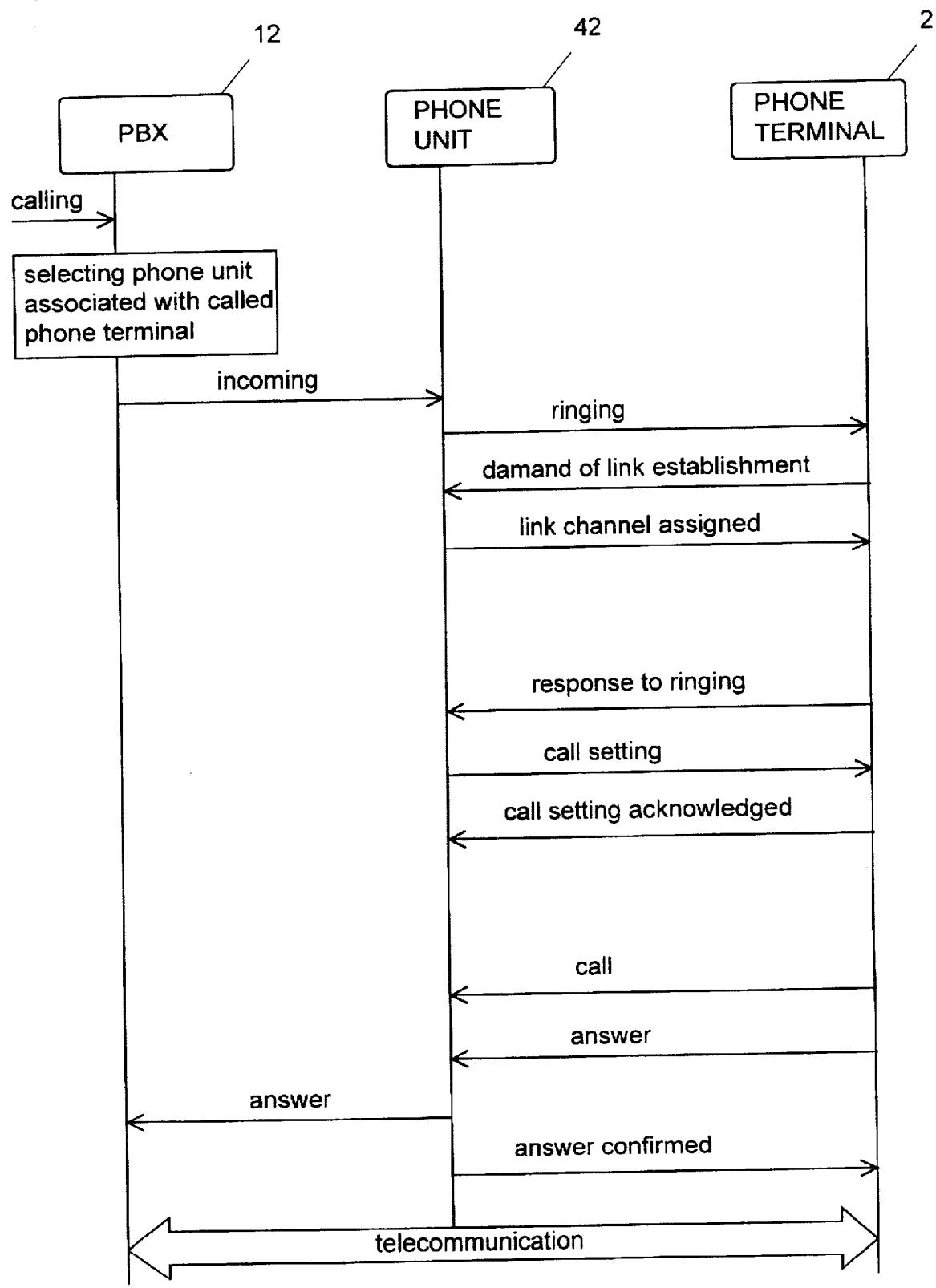
FIG. 11 illustrates a scheme of telecommunication between the PBX and the personal handy phone.

Communication sequence between the PBX 12 and the phone unit 42 is shown in FIG. 11. When the phone terminal 2 is called, the PBX 12 designates one of the phone unit 42 associated with the called terminal and delivers the incoming to thus designated phone unit 42, which in turn gives a ringing to the called phone terminal 2. Then, the phone terminal 2 responds to return a demand of link establishment to the phone unit 42, after which the phone unit 42 assigns a link channel to the phone terminal 2. Upon receiving an ringing response from the phone terminal 2, the phone unit 42 gives a call setting to the terminal 2 which in turn acknowledges of the call setting. Thereafter, the terminal 2 issues a call and answer signal to the phone unit 42. Upon this occurrence, the phone unit 42 delivers the answer signal to the PBX 12 and at the same time delivers an answer confirmation to the phone terminal 2. Thus, the communication link is made between the PBX 12 and the phone terminal 2 for telecommunication therebetween.

Figure 12:
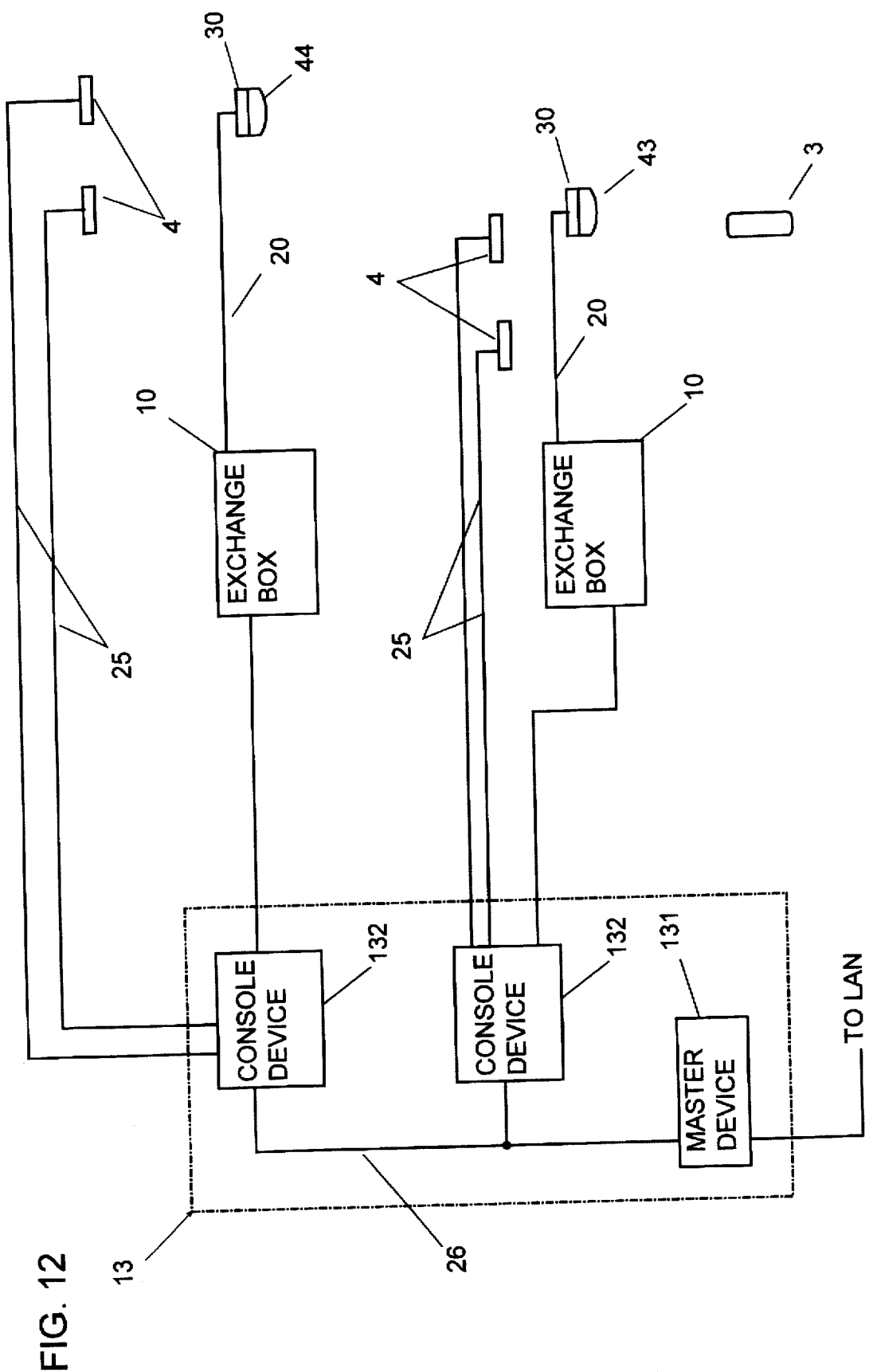
FIG. 12 is a block diagram of a load management network realized by the present system.

The load management system will be explained with reference to FIG. 12. The system includes the gateway 13 in the form of a time division multiplexing controller, the remote controller unit 43, and the detector unit 44, which units are mounted to the receptacles 30. The gateway 13 comprises a master device 131 and a plurality of console devices 132 provided with relays for controlling to turn on and off the loads, for example, lighting equipment 4 which are connected through a cable 25 to the console devices 132. The console device 132 is connected in a multi-drop manner to the master device 131 through a two-wire line 26 and is further wired to the exchange box 10. The remote controller unit 43 and the detector unit 44 are thus connected to the console devices 132 through the exchange box 10 for giving a control signal thereto. The detector device 44 includes a human detector which gives an output indicating that a human comes within a detection area covered by the detector unit 44 for notifying the presence of the human in the region. The master device 131 gives an access to the console devices 132 cyclically by designating individual addresses given to the console devices 132 for checking the control signal fed from the units 43 and 44 and for controlling to turn on and off the lighting equipment 4 associated with the console devices being accessed. For example, when the remote controller 3 gives a light remote signal to turn on the particular lighting equipment 4, the remote controller unit 43 responds to transmit the corresponding control signal to the master device 131 when accessed by the master device 131. Then, the master device 131 instructs the terminal device 132 associated with the particular lighting equipment 4 for turning on the equipment 4. The detector unit 44 is likewise connected to the console unit 132 to give the control signal when the human comes within the detection area such that the master unit 131 instructs the console unit 132 to turn on the associated lighting equipment.

Figures 13, 14:
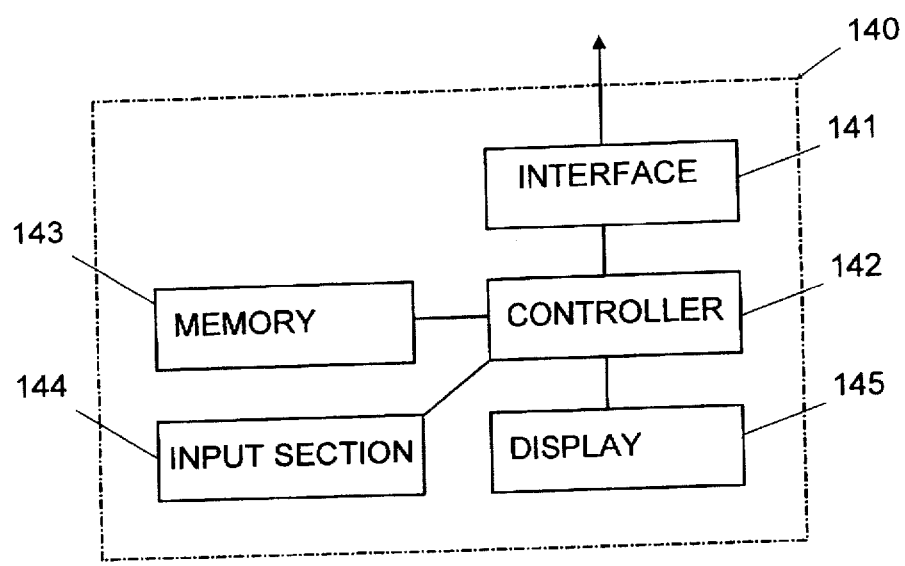
FIG. 13 is a block diagram illustrating a supervisor utilized in the present system.
FIG. 14 is a location table of the local transmitter-receivers as displayed in the supervisor.

In order to supervise the operations of the above systems, a supervisor 140 is connected to the hub 11. The supervisor may be an independent device or configured as a part of a server for the wired LAN, and comprises, as shown in FIG. 13, an interface 141 for data transfer with the wired LAN, a controller 142 made of a microprocessor, a memory 143, an input section 144 for entry the setting of the receptacles 30, and a display 145 for notifying the status of the receptacles 30 and the types of units mounted thereto in a manner as shown in FIG. 14, wherein A, B, C in the location column indicate a section within the premises and 1, 2, 3 indicate a division in the section. For example, A-1 in the location column means that the receptacle is located at a division 1 of an section A. In FIG. 14, PHP and LAN-RPT in the unit type column represent the phone unit 42 and the LAN unit 41, respectively.

Figure 15:
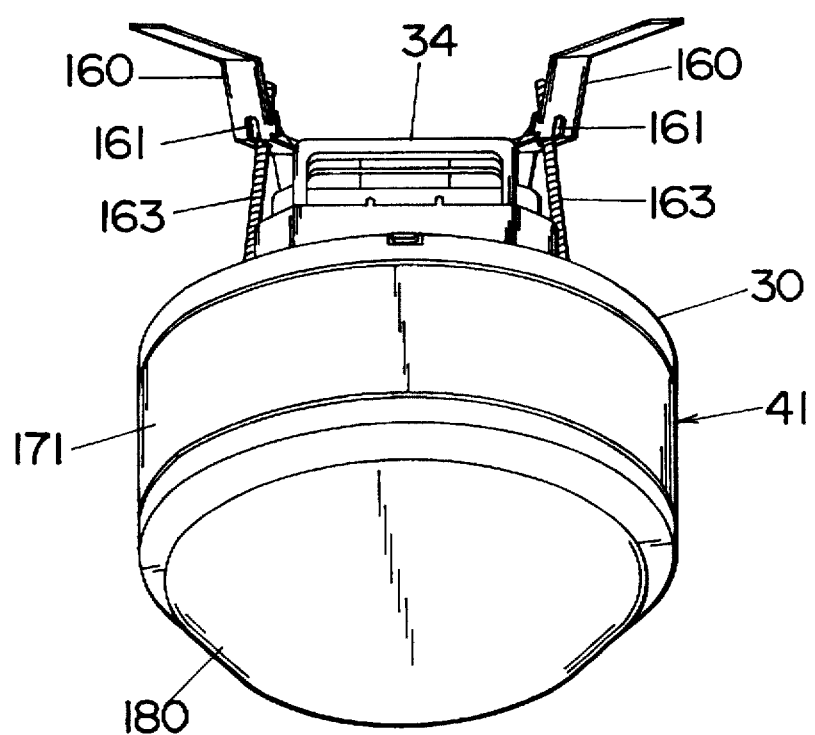
FIG. 15 is a perspective view of the local transmitter-receiver as mounted to a receptacle.
Figure 16:
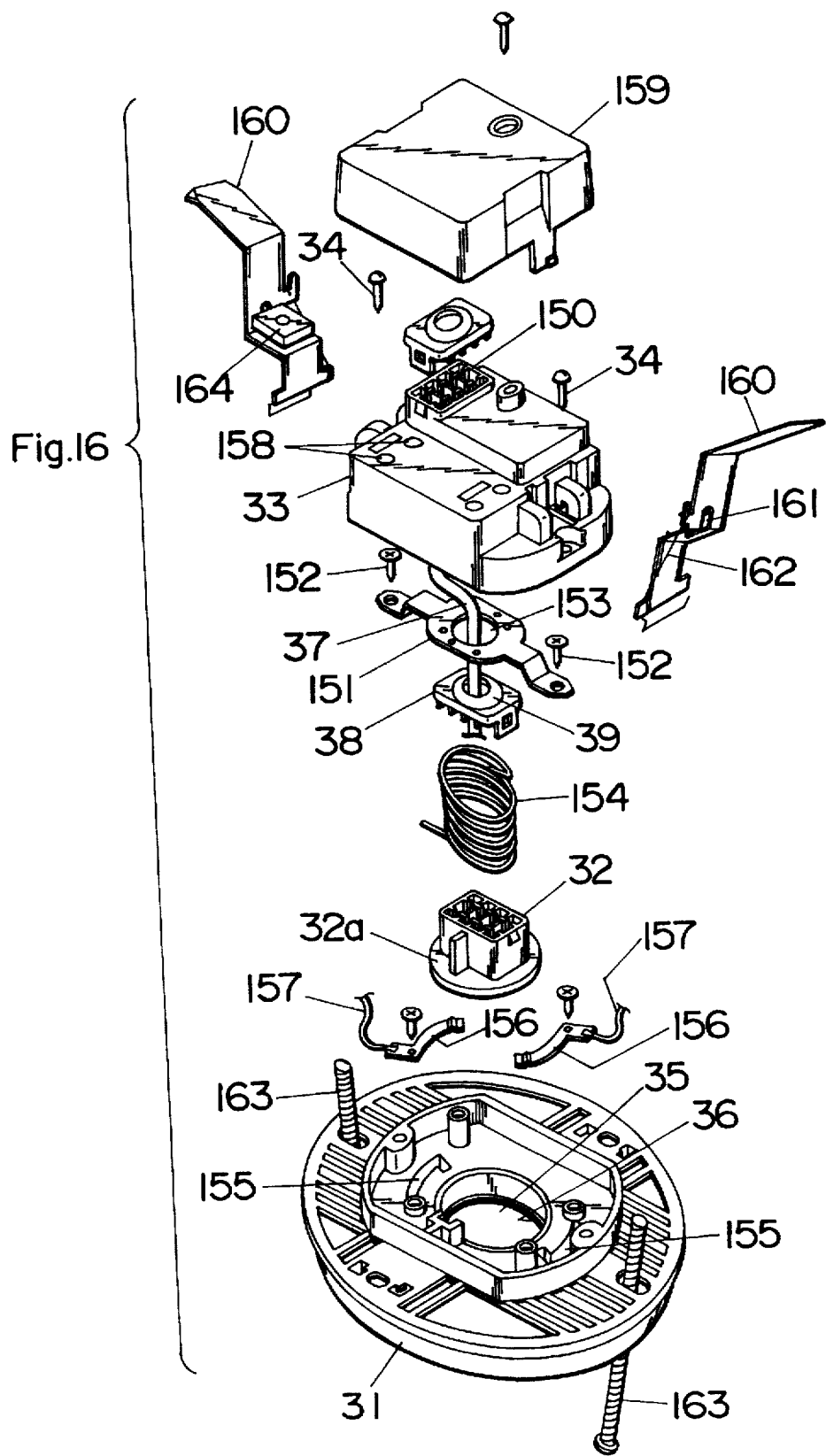
FIG. 16 is an exploded perspective view of the receptacle.

Referring to FIGS. 15 and 16, explanation is made to the structure of the receptacle 30 having the connector common to the above described units 41 to 44. The receptacle 30 comprises a disc base 31 s carrying the connector 32 in the form of a modular jack and a cover 33 assembled to the base 31 by means of screws 34. The base 31 has a center opening 35 with an inner flange 36 projecting inwardly from the lower circumference of the opening to support the jack 32 so that the jack 32 is rotatably received in the opening. The jack 32 is provided in its lower end with a shutter (not shown) and with a plurality of terminal lugs exposed in the upper end for connection with a cable 37. A jack cover 38 is hooked to the upper end of the jack 32 to conceal connection of the cable 37 and the jack. The jack 32 is held on the base 31 together with the jack cover 38 by means of a retainer plate 151 secured to the base by screws 152, whereby the jack 32 is held between the retainer plate 151 and the inner flange 36. The retainer plate 151 has a center hole 153 into which a rounded projection 39 on the jack cover 38 fits for allowing the jack 36 to rotate about a vertical axis together with the jack cover 38. A coil spring 154 fits loosely around the jack 32 between the retainer plate 151 and a flange 32a at the lower end of the jack 3. The upper end of the coil spring 154 is engaged to the jack 32 and the lower end of the coil spring 154 is engaged to a stopper 31a formed on the base 31 adjacent the center opening 35 such that as the jack 32 rotates relative to the base 31 the spring 154 is wound to thereby accumulate a bias of returning the jack. The base 31 is formed with a pair of arcuate slots 155 which are diametrically opposed about the center opening 35 to receive a pair of prongs 174 projecting from each of the units 41 to 44. Secured to the base 31 adjacent the slots 155 are contacts 156 which are connected to electrical wires 157 and which comes into electrical contact with the prongs 174 when the unit is mounted to the receptacle 30 for supplying voltage to the unit. Each of the units 41 to 44 is configured to have, in addition to the prongs, a plug 176 which is inserted to the jack 32 for signal correspondence therebetween. Mounting of the unit to the receptacle 30 is made by inserting the prongs 174 into the slots 155 and subsequently rotating to some angle, after which the prongs 174 comes into firm engagement with the ends of the slots 155 while the jack 32 rotates correspondingly to wind the coil spring 154. The cover 33 fitted over the jack 32 to the base 31 is formed with quick connection sockets (not shown) at which the electrical wires 157 terminate and to which wires from the electrical source are connected simply by inserting the ends of the wire into socket holes 158. Additional sockets may be formed for feeding the electricity to the adjacently installed receptacle 30. The cable 37 extending from the jack 32 terminates in a socket 150 formed in the cover 33 for connection to a cable routed in the premises. The cable defines the transmission channel 20 either alone or in combination with the wire leading to the contacts 156. A cap 159 is fitted over the cover 33.

The receptacle 30 is provided with a pair of mounting brackets 160 for mounting the receptacle 30 easily to a mounting surface of a ceiling, wall or floor of the premises. The bracket 160 is provides as a generally M-shaped metal member having a slot 161 extending over a center bent. The bracket 160 is pivotally supported at one end to the cover 33 so that it is capable of spreading out. A spring 162 is provided to extend between the longitudinal center of the bracket 160 and a portion of the cover adjacent the pivot end of the bracket so as to hold the bracket in the closed position. The receptacle 30 is installed to the mounting surface simply by placing the upper portion of the receptacle into a mount hole (not shown) in the surface and by tightening screws 163 which extends through the periphery of the base 31 and through the slots 161 in the bracket in threaded engagement with nuts 164. As the screws 163 are tightened, the nuts 164 moves along the length of the bracket so as to spread out the brackets 160 behind the mounting surface against the bias of the spring 162, thereby grasping the periphery of the mount hole between thus expanded brackets and the rim portion of the base 31. The brackets 160 are normally held closed by the springs 162 so as to be readily guided into the mount hole.

Figure 17:
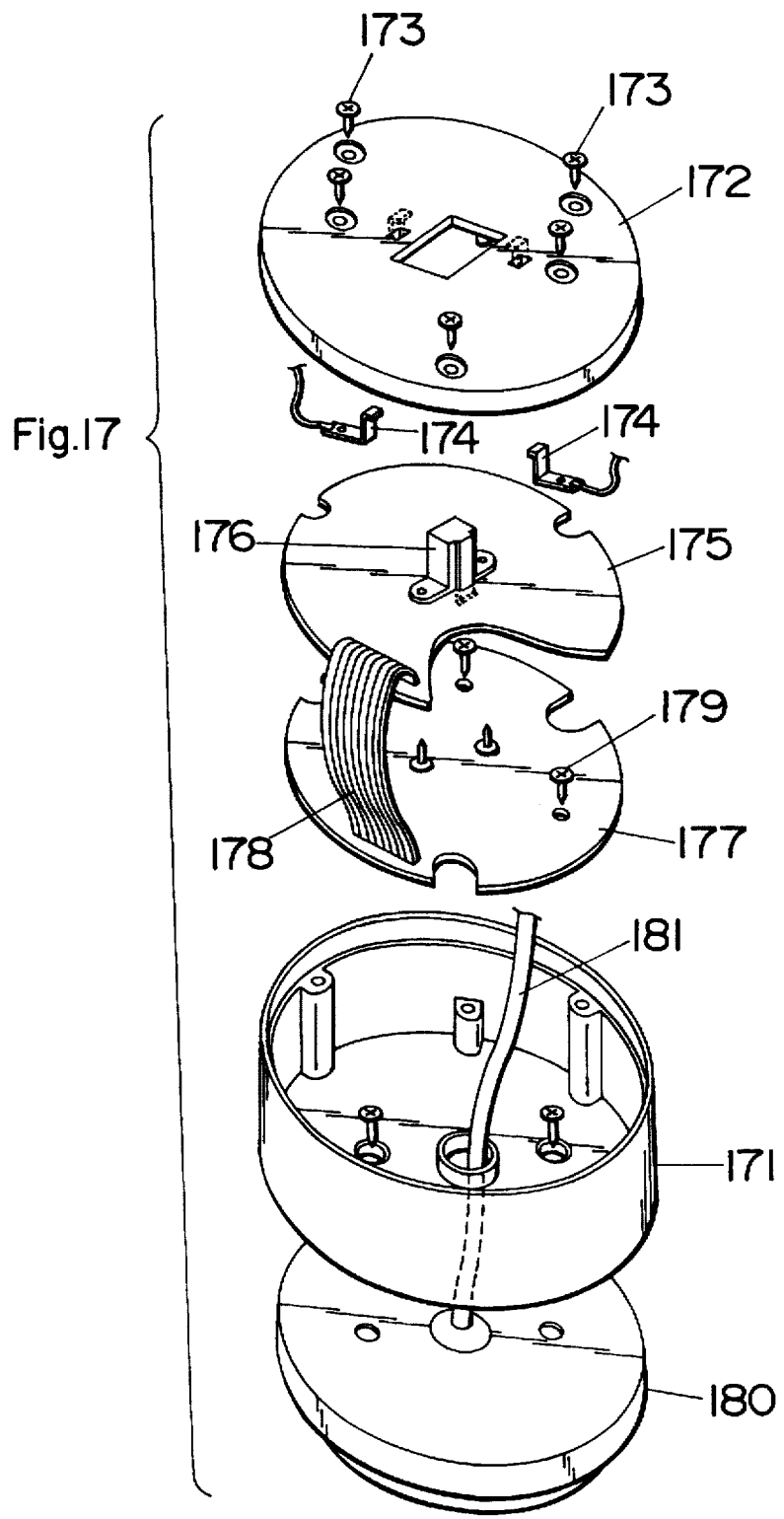
FIG. 17 is an exploded perspective view of the local transmitter-receiver.

FIG. 17 shows the structure of the LAN unit 41, which is substantially identical to the other units 42 to 44. The unit 41 has a housing comprising a top-opened barrel 171 and a cover plate 172 secured thereto by screws 173 and carrying the prongs 174. Accommodated within the barrel 171 is a first printed board 175 carrying the plugs 176 for connection into the jack 32 of the receptacle 30 and a second printed board 177 forming thereon a necessary electronic circuit. A flat cable 178 is provided for electrical connection between the printed boards 175 and 177 which are secured to the barrel 171 by screws 173 and 179. Secured to the bottom of the barrel 171 is an antenna module 180 incorporating the antennas 81 and 82 and connected to the circuit on the printed board 177 though a cable 181.

What is claimed is:

1. An intra-premises communication system comprising:
    an exchange box mounted in premises and having different interfaces for connection to different networks;
    a plurality of wired transmission channels routed in the premises to extend from said exchange box and terminate to receptacles installed in said premises, and said receptacles having a common connector;
    a plurality of indoor wireless terminals of different types; and
    a plurality of local transmitter-receivers of different types each detachably and selectively mounted to said common connector of the receptacle for wired communication with one of said different networks through the associated transmission channel, each of said local transmitter-receivers having means for wireless communicating with at least one of said terminals and having conversion means for converting between information carried by way of said wired communication through said transmission channel and the information carried by way of said wireless communication,
    said exchange box having switch means for selectively connecting said transmission channels to particular ones of said interfaces in order to allocate the local transmitter-receivers of the different networks.

2. An intra-premises communication system as set forth in claim 1, wherein said wireless terminals include data terminals and wherein said local transmitter-receiver includes means which is cooperative with one of said interfaces to construct a local area network which enables data transmission among said data terminals.

3. An intra-premises communication system as set forth in claim 1, wherein said wireless terminals include personal handy phone terminals and wherein said local transmitter-receiver includes means for intercommunication with said phone terminals, said interface comprising a private branch exchange (PBX) for connecting of said transmission channels to an outside network.

4. An intra-premises communication system as set forth in claim 1, wherein said interfaces are arranged to enable intercommunication between said networks.

5. An intra-premises communication system as set forth in claim 1, wherein said receptacle comprises a base plate carrying a pair of mounting brackets which are pivotally supported at one end to said base plate, and a pair of screws each extending through a periphery of said base plate and through an intermediate portion of said bracket, said base plate having a circumference which abuts against a periphery of a mounting hole provided in a mounting surface of said premises with said brackets projecting through said mounting hole, said screws being in threaded engagement with said brackets in such a manner that tightening of screws causes said brackets to expand behind said mounting surface for gripping the periphery of said mounting hole between said bracket and said circumference of said base plate.

6. An intra-premises communication system as set forth in claim 5, wherein said receptacle has a pair of electrical contacts connected to a power source, said receptacle being formed with a pair of slots which engages with prongs projecting from said local transmitter-receiver, said electrical contacts being positioned adjacent said slots to be in electrical connection with said prongs for supplying an electric power to said local transmitter-receiver.

7. An intra-premises communication system as set forth in claim 5, wherein said receptacle has said connector in the form of a modular jack connected to said transmission channel, said local transmitter-receiver having a plug detachable to said modular jack.

8. An intra-premises communication system, comprising:

an exchange box mounted in premises and having different interfaces for connection to different networks;

a plurality of wired transmission channels routed in the premises to extend from said exchange box and terminate to receptacles installed in said premises, and said receptacles having a common connector;

a plurality of indoor wireless terminals of different types; and a plurality of dedicated local transmitter-receivers of different types each detachably and selectively mounted to said common connector of the receptacle for wired communication with one of said different networks through the associated transmission channel, each of said local transmitter-receivers having means for wireless communicating with at least one of said terminals and having conversion means for converting between information carried by way of said wired communication through said transmission channel and the information carried by way of said wireless communication, said exchange box having switch means for selectively connecting said transmission channels to particular ones of said interfaces in order to allocate the local transmitter-receivers of the different networks.

* * * * *